Figure 1:
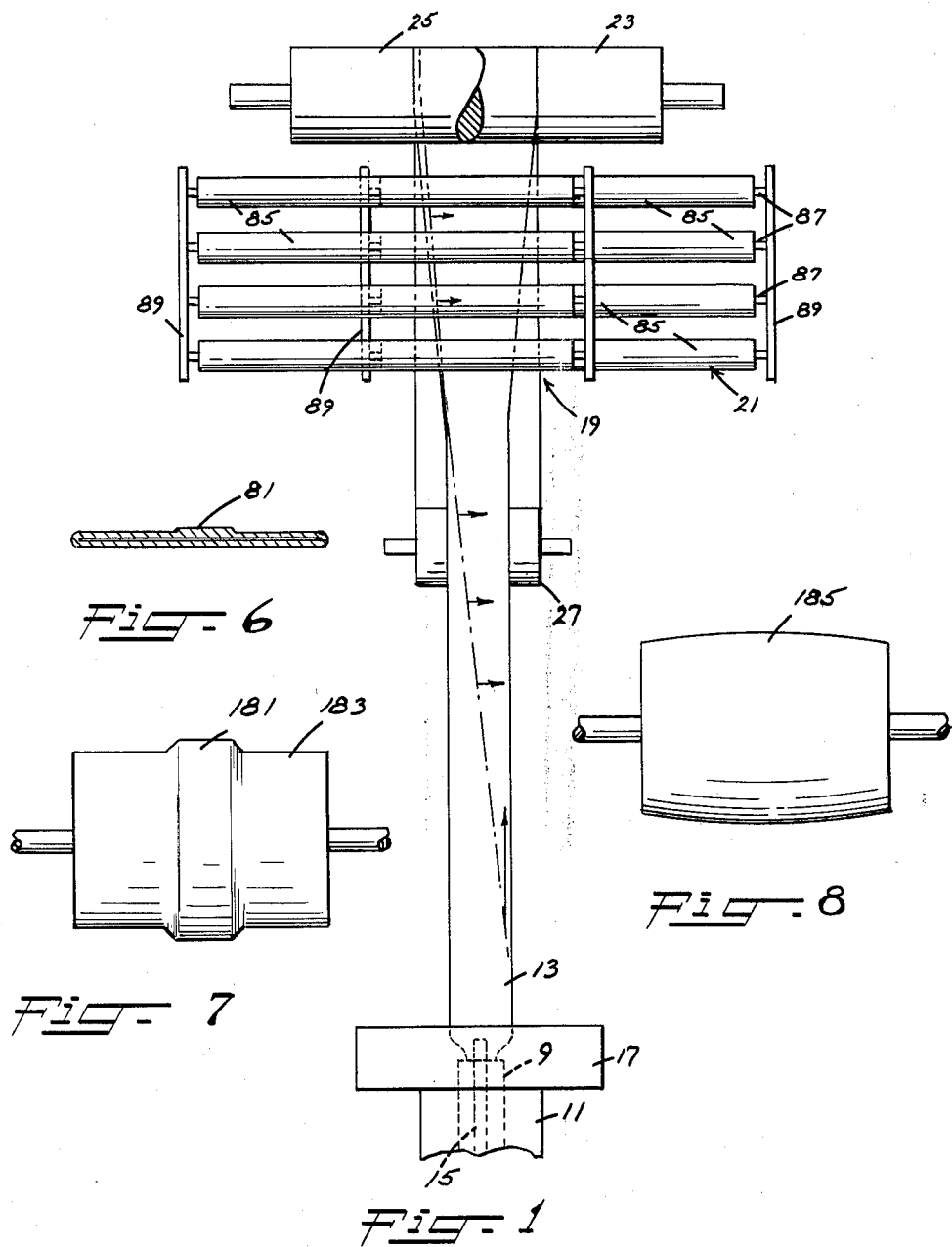

March 8, 1966  H. P. FRY, JR  3,238,564
APPARATUS FOR FORMING AND COLLECTING THIN-WALL TUBING
Original Filed Oct. 10, 1962  4 Sheets-Sheet 1

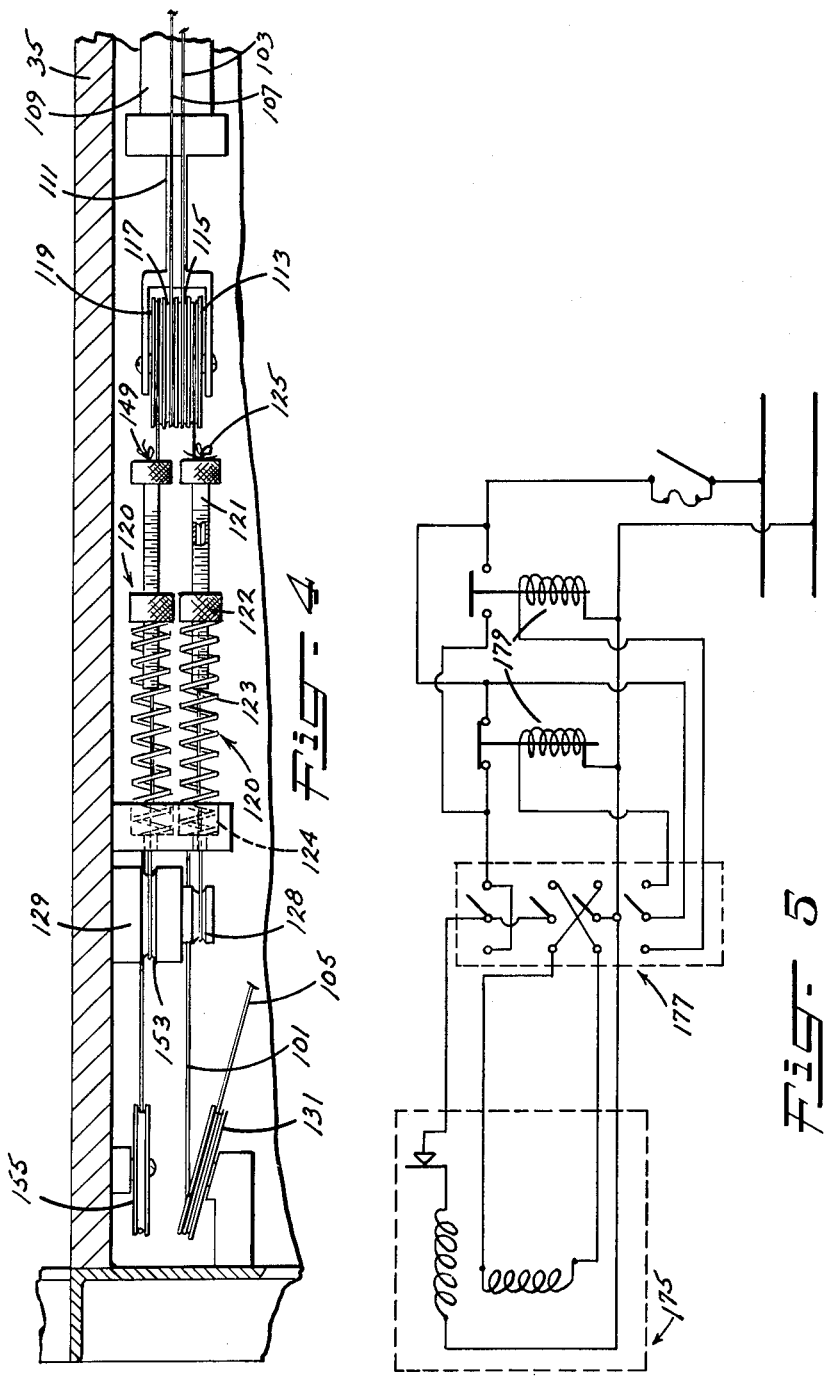

United States Patent Office 3,238,564
Patented Mar. 8, 1966

3,238,564
APPARATUS FOR FORMING AND COLLECTING THIN-WALL TUBING
Horace P. Fry, Jr., West Chester, Pa., assignor to FMC Corporation, Philadelphia, Pa., a corporation of Delaware
Original application Oct. 10, 1962, Ser. No. 229,671. Divided and this application May 1, 1964, Ser. No. 364,241
10 Claims. (Cl. 18—14)

The present invention relates to the manufacture of thin-walled tubing from thermoplastic film-forming materials, and more particularly, to apparatus for collapsing a thin-walled tubing so that longitudinally extending elements thereof which differ in thickness are prevented from being repeatedly collapsed upon themselves.

This application is a division of application Serial No. 229,671, filed October 10, 1962, and entitled Manufacture of Thin-Wall Tubing.

In the conventional manufacture of thin-walled tubing, a molten thermoplastic film-forming material is extruded through an annular die in the form of a tubing which is then expanded, cooled, collapsed while being continuously advanced longitudinally, and finally collected in a flattened condition by being wound upon itself. Notwithstanding the care exercised, it is seldom possible to produce thin-walled tubing which is free of thick and thin bands or longitudinally extending elements which differ in thickness. Such differences in thickness along the wall of the tubing are attributed to one or a combination of such factors as temperature or pressure differentials around the annular die, deposits of foreign materials within the die, improper die construction or adjustment, or non-uniform cooling of the extruded tubing.

Generally, the differences in thickness between such elements of the tubing wall are minute but become quite evident when laid upon themselves numerous times. For example, a variation in the thickness of such elements of one ten-thousandth of an inch will develop a ridge or depression of one-tenth of an inch in one thousand layers of the collapsed tubing. In a wound package, such variation in the thickness of elements of the tubing would amount to a difference of approximately one-quarter of an inch, as measured diametrically of the package.

It will be apparent that as a tubing having thick and thin bands or elements is being wound in roll form, each added layer is deformed more than a previous layer and soon reaches undesirable proportions. Furthermore, such deformation in the wound tubing becomes set after a relatively short storage period and when ultimately unwound is difficult, if not impossible, to print and provides articles which are unattractive to the consumer. Accordingly, a primary object is to provide a generally new or improved and more satisfactory apparatus for manufacturing and collecting thin-walled plastic tubing.

Another object is the provision of apparatus for collapsing an expanded thin-walled plastic tubing so that longitudinally extending elements thereof which differ in thickness do not assume the same positions relative to each other as the collapsed tubing is wound into a roll form.

Still another object is the provision of apparatus for rotating an expanded thin-walled plastic tubing about its longitudinal axis at least at intermittent intervals and while the tubing is being collapsed into a flattened condition whereby the tubing is flattened along longitudinal fold lines which occur on different longitudinal elements of the tubing.

Figure 2:
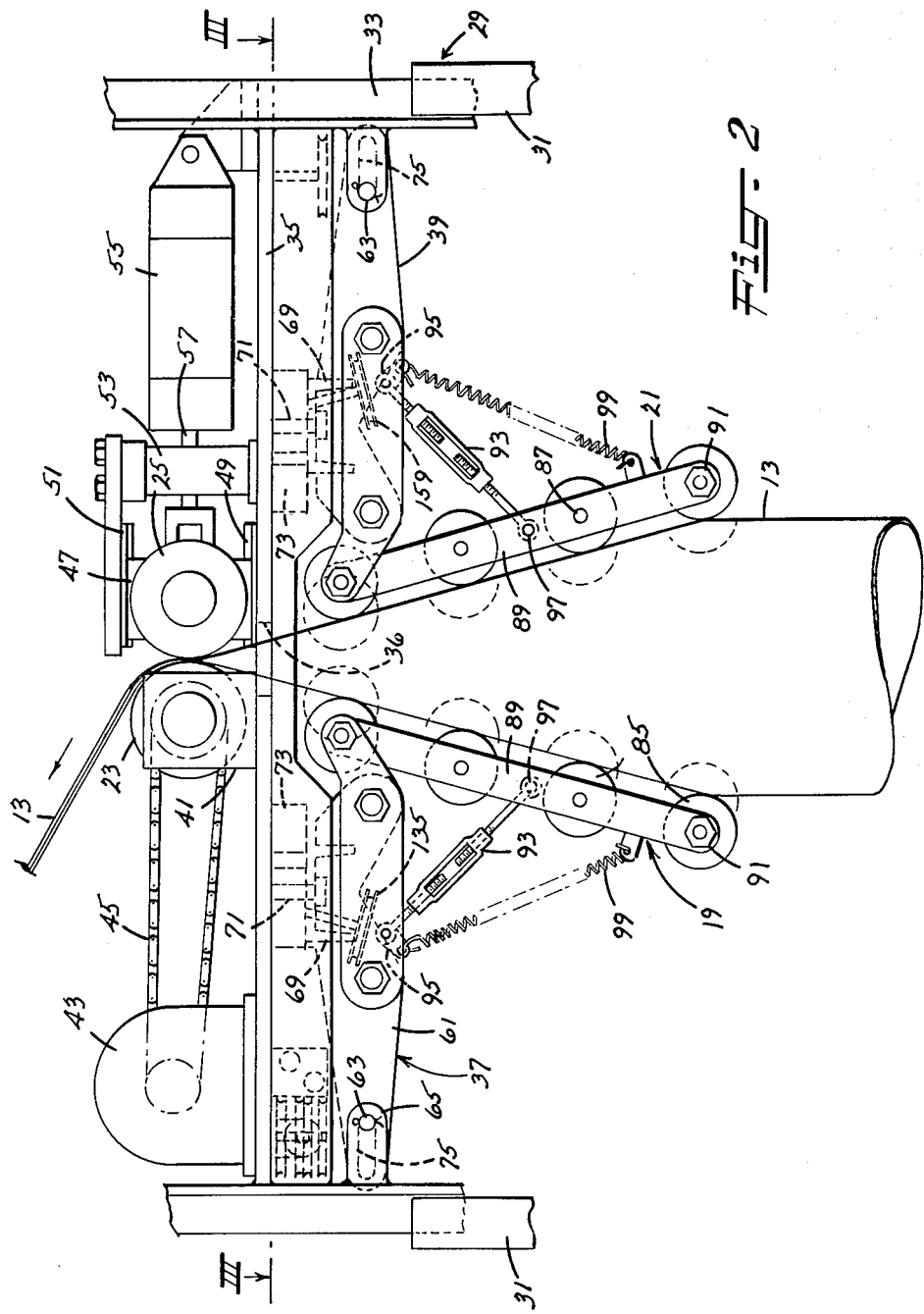
Figure 3:
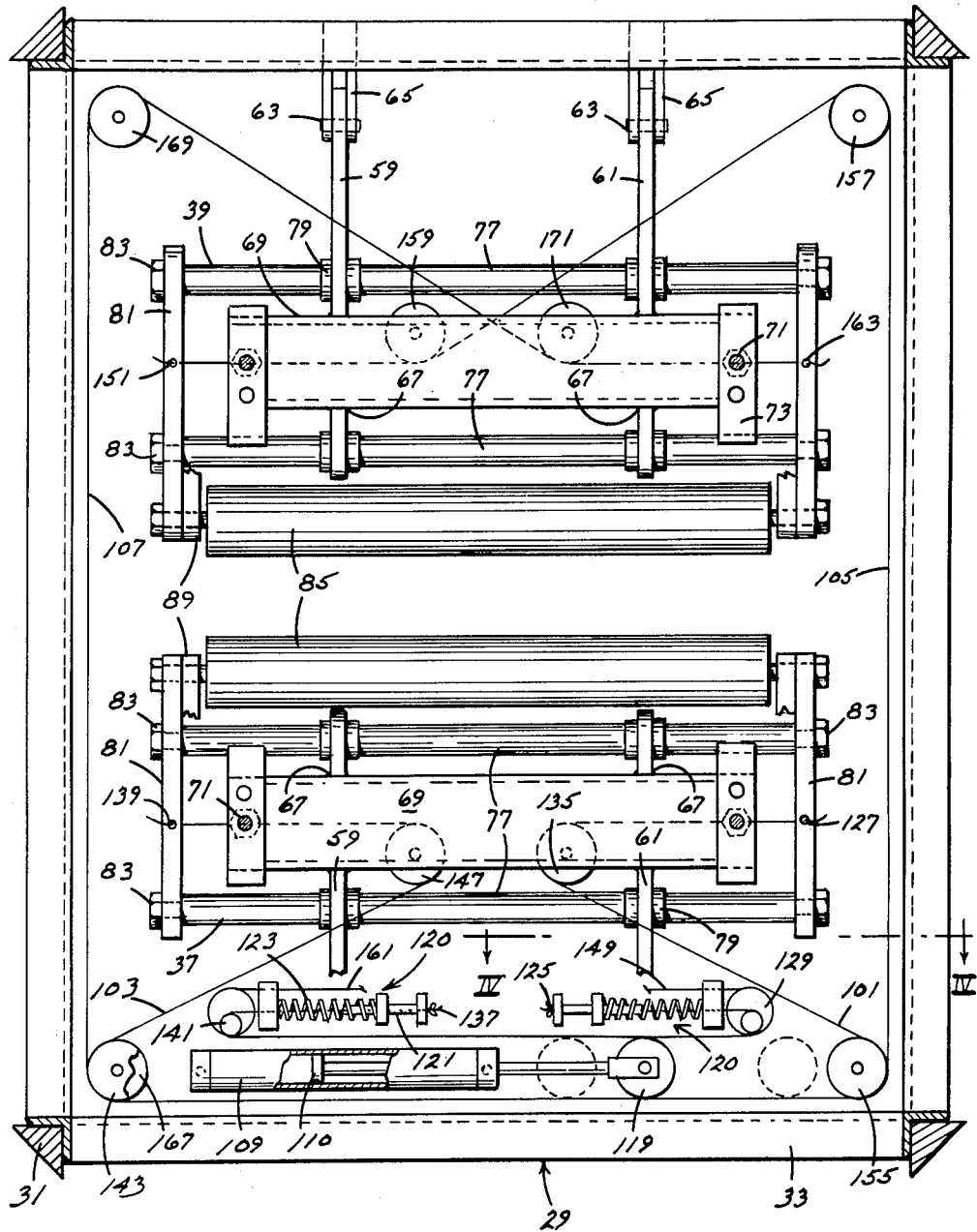

These and other objects and advantages of the invention will be apparent from the following description and accompanying drawing in which:

FIGURE 1 is a diagrammatic illustration of the apparatus of the present invention in use;
FIGURE 2 is an enlarged side view of a collapsing frame assembly incorporated into the apparatus shown in FIGURE 1;
FIGURE 3 is a plan view of a portion of the apparatus shown in FIGURE 2 as viewed in the direction of arrows III—III;
FIGURE 4 is a vertical section taken approximately along the line IV—IV in FIGURE 3;
FIGURE 5 is a diagram of the electrical means employed in effecting controlled reciprocation of cooperating collapsing frames;
FIGURE 6 is a sectional view taken transversely of a flattened tubing having longitudinally extending elements which differ in thickness;
FIGURE 7 illustrates a roll formed by winding the flattened tubing shown in FIGURE 6 in accordance with conventional procedures; and
FIGURE 8 illustrates a roll formed by winding the flattened tubing shown in FIGURE 6 in accordance with the teaching of the present invention.

Generally, with the improved apparatus of the present invention a thin-walled plastic tubing is at least intermittently rotated or oscillated about its longitudinal axis during its formation and while being collapsed into a flattened condition. As a result of this movement, thick and thin bands or elements of the tubing are not always collapsed and collected in the same positions relative to each other and to the roll on which the collapsed tubing is wound. Preferably, the tubing is positively or forcibly rotated in opposite directions about its longitudinal axis at intermittent intervals so that the tubing can assume its initial or an approximately neutral position after each rotation thereof. That is, after positively rotating the tubing in one direction about its longitudinal axis, the tubing is permitted to unwind or assume an approximately neutral position after such rotation before it is positively rotated in an opposite direction about its longitudinal axis. In this manner, the positions of the elements of the tubing wall which differ in thickness are varied relative to the longitudinal fold lines and are laterally offset from each other when the flattened tubing is collected in roll form.

Broadly, the apparatus of the present invention includes a pair of collapsing frames which are disposed in converging relationship so as to effect collapse of an expanded tubing as it travels therebetween, a pair of nip rolls for longiutdinally advancing the collapsed tubing, means for moving the collapsing frames at intermittent intervals in opposing directions and substantially transversely of the tubing so as to periodically oscillate the same about its longitudinal axis, and means for winding the collapsed tubing in the form of a roll after it leaves the nip rolls.

The apparatus of the present invention is in no way limited by the particular thermoplastic film-forming material employed in the practice of the invention or the size of the thin-walled tubing which is formed.

With reference to the accompanying drawing, FIGURE 1 diagrammatically illustrates a conventional annular die 9 which is connected to an extruder 11 and from which a molten thermoplastic material may be continuously extruded as a thin-walled tubing 13. A conduit 15 extends up through the die 9 and serves to deliver a fluid, such as air, into the freshly extruded tubing 13 for expanding the same, while a ring 17 directs air or other gas against the exterior of the expanded tubing 13 to cool the wall thereof. Once solidified, the tubing 13 passes between collapsing frames 19 and 21 and nip rolls 23 and 25 and is then collected in a collapsed or flattened condition as a roll 27.

The collapsing frames 19 and 21 together cooperate to collapse the tubing 13 while simultaneously and periodically rotating the same about its longitudinal axis. With this arrangement, and as more fully described hereafter, the positions of elements of the tubing which differ in thickness are varied relative to the longitudinal fold lines so that successive convolutes of an element of the tubing are laterally offset from each other on the roll 27.

As shown in FIGURES 2 and 3, the apparatus of the present invention includes a tower 29 having an outer fixed section 31 and an inner section 33 which is adapted to be selectively moved toward and away from the extrusion die 9 by suitable means, not shown. A platform 35 is fixed to the inner or movable section 33 of the tower 29 and is provided with a central opening 36 through which the tubing 13 extends. On its upper surface the platform 35 supports the cooperating nip rolls 23 and 25, while from its lower or under surface depend slide frames 37 and 39 which in turn carry the collapsing frames 19 and 21.

The nip rolls 23 and 25 together advance the tubing 13 continuously and serve to maintain or retain the same in a collapsed or flattened condition as it leaves the collapsing frames 19 and 21. The nip roll 23 is rotatably supported by conventional fixed bearings 41 and is driven by motor 43 through an endless chain 45. The nip roll 25, however, is rotatably supported by bearings 47 which are adapted to slide relative to fixed guides 49 and 51, the latter of which are supported by posts 53 fixed to the platform 35. Conventional air cylinders 55 serve to drive piston rods 57 which in turn selectively position the slide bearings 47 and nip roll 25 relative to the nip roll 23.

The slide frames 37 and 39 are of the same construction and perform similar functions and thus, from the standpoint of simplicity and clarity, a description of only one of such frames is provided. As shown in FIGURES 2 and 3, the frame 37 is slidably supported by arms 59 and 61 which are pivotally connected by pins 63 to lugs 65 projecting from the tower section 33. Both of such arms 59 and 61 are also welded at 67 to flanges of a channel 69, which is releasably connected by bolts 71 to spacer blocks 73 fixed to the underside of the platform 35. It will be noted that the arms 59 and 61 are slotted at 75 and that the spacers blocks 73 are each provided with at least two openings for the bolts 71 so as to permit the frame 37 to be adjusted, for example, to accommodate tubings of different diameters.

The slide frames 37 and 39 each include a pair of slide bars 77, which extend through bearings 79 in the arms 59 and 61, and plates 81 which are secured across the ends of the slide bars 77 by bolts 83. The collapsing frames 19 and 21, as best shown in FIGURES 1 and 2, each include a series of idler rolls 85 having projecting shafts 87 which extend through bars 89 and are secured thereto by nuts 91. In each of the collapsing frames 19 and 21 the shafts 87 of the uppermost rolls 85 also extend through and are pivotally secured to the projecting portions of the plates 81 by nuts 91. The collapsing frames 19 and 21 are supported in converging relationship by adjustable links 93 which are pivoted at 95 and 97 to the slide frame end plates 81 and the collapsing frame side bars 89, respectively. Tension springs 99 also extend between each collapsing frame and its adjacent slide frame to dampen vibrations or other undesired movement of the collapsing frames.

As heretofore mentioned, the collapsing frames 19 and 21 are intended to be reciprocated in opposite directions relative to each other at intermittent intervals to effect rotation of the tubing 13 about its longitudinal axis. This reciprocating movement of the collapsing frames 19 and 21 is effected in timed relationship by cables 101, 103, 105 and 107 and a cooperating hydraulic cylinder 109 and piston 110. Hydraulic fluid is delivered to and withdrawn from the opposite sides of the piston 110 by conventional means, not shown, for selectively projecting and retracting a piston rod 111 on which are supported four concentric sheaves 113, 115, 117 and 119.

The cables 101, 103, 105 and 107 are each fixed at one end to a separate shock absorbing mechanism 120 which includes a plunger 121 threadedly connected at 122 to a resilient cylinder 123 fixed at 124 to the platform 35. At their opposite ends, the cables 101, 103, 105 and 107 are fixed to the end plates 81 of the respective slide frames 37 and 39. Thus, one end of the cable 101 is fixed at 125 to a shock absorber 120 while its opposite end is secured at 127 to one of the end plates 81 of the slide frame 37. The portion of the cable 101 intermediate its ends is laced within a groove 128 of an annular guide 129, the sheave 113, and pulleys 131 and 135. The guide 129 and pulley 131 are supported from the platform 35, as shown in FIGURE 4, while the pulley 135 projects angularly from the adjacent channel 69, as shown in FIGURE 2.

The ends of the cable 103 are likewise secured at 137 to a shock absorber 120 and at 139 to the other end plate 81 of the slide frames 37. The portion of the cable 103 intermediate its ends is laced over an annular guide 141, about the sheave 115 and pulleys 143 and 147. The guide 141 and pulley 143 correspond with the guide 129 and pulley 131 heretofore mentioned while the pulley 147 is similar to the pulley 135. From the arrangement thus far described, it will be apparent that as the piston rod 111 is retracted into the cylinder 109, the cable 101 serves to pull the slide frame 37 to the left, as viewed in FIGURE 3, and as the piston rod 111 is projected the cable 103 urges the slide frame 37 to the right.

The cables 105 and 107 together serve to reciprocate the slide frame 39 in synchronism with but in a direction opposite to the movement of the slide frame 37. Thus, one end of the cable 105 is secured at 149 to a shock absorber 120 while its opposite end is fixed at 151 to one end plate 81 of the slide frame 39. Between its ends the cable is laced within a groove 153 of the annular guide 129, the sheave 119 and pulleys 155, 157 and 159. As shown in FIGURES 2, 3 and 4, pulleys 155 and 157 are supported from the platform 35 while the pulley 159 projects angularly from the adjacent channel 69. The cable 107, on the other hand, is fixed at 161 to a shock absorber 120 and at 163 to the other end plate 81 of the slide frame 39. Between its two fixed ends, the cable 107 is laced about the annular guide 141, sheave 117 and pulleys 167, 169 and 171 which correspond with the pulleys 155, 157 and 159 respectively.

It will be apparent that as the slide frame 37 moves to the right, as viewed in FIGURE 3, with the projection of the piston rod 111 from the cylinder 109, the cable 107 pulls the slide frame 39 to the left so that both frames move simultaneously at substantially the same rate and to the same degree, but in opposite directions. As the piston rod 111 is retracted into the cylinder 109, movement of the frames 37 and 39 is, of course, effected in directions opposite to that indicated above.

At the start of operations, molten thermoplastic film-forming material extruded from the die 9 as a tubing 13 is chilled by cool air delivered by the ring 17 and laced through the platform opening 36 and between the rotating nip rolls 23 and 25. Air is then delivered through the conduit 15 to expand the tubing 13 and hydraulic fluid is delivered to the cylinder 109 to intermittently move the piston 110 and reciprocate the slide frames 37 and 39, as heretofore described.

The piston 110 which travels within the cylinder 109 is actuated by a conventional hydraulic pump having reversible motor as diagrammatically illustrated at 175 in FIGURE 5. Reversals of the motor 175 are controlled by a four pole, double throw switch 177 which is actuated by a suitable trip arm (not shown) located on the platform 35 in the path of the collapsing frames 19 and 21. The electrical circuit is also equipped with two adjustable time delay relays 179 which determine the length of time the reversible motor is stationary during the reversing interval.

The function of the apparatus is, of course, to rotate the tubing 13 about its longitudinal axis as the tubing leaves the extrusion die and before it passes in-between nip rolls 23 and 25. This movement of the tubing 13 is much the same as rolling a pencil back and forth between the palms of one's hands, in that movement of one side of the tubing is offset by movement of the other side in an opposite direction. Thus, by reciprocating the collapsing frames 19 and 21 simultaneously in opposite directions and to the same extent, both sides of the tubing 13 are moved at the same rate so that the tubing will not shift from its normal path.

As heretofore mentioned, the tubing is positively or forcibly rotated in opposite directions about its longitudinal axis preferably at intermittent intervals so that a dwell or delay period is provided between each such rotation or oscillation. The energy transferred to the tubing during one such rotation serves to return (or untwist) the continuously advancing tubing to its initial or neutral position during the dwell period. As the tubing again approaches or reaches its initial or neutral position, the collapsing frames 19 and 21 are reciprocated in the opposite directions so as to positively or forcibly rotate the tubing in opposite directions. This rotation of the tubing is also followed by a period of dwell during which the collapsing frames remain stationary while the tubing again rotates or untwists under its own energy toward initial or neutral position to thereby complete one oscillation cycle.

The dwell period provided after the positive or forced rotation of the tubing is essential for the satisfactory practice of the present invention. If such dwell were omitted, the forced rotations would occur during the natural rotations of the tubing so that the total amount of tubing rotation would be reduced. The period of dwell between oscillations of the tubing is based on the time needed for the tubing to return to or approach a neutral position and is equal to or approximates the time necessary for a point at which the tubing first starts to turn to travel to the collapsing frames. Preferably, the dwell period is slightly less than the time required for the tubing to return to its initial position so as to avoid rotating the tubing from a "standing start."

To better illustrate the advantages of the present invention, reference is made to FIGURES 6, 7 and 8 of the drawing. With conventional procedures, a thin-walled tubing, having a longitudinally extending element 181 which differs in thickness from the remainder of the tubing wall, would provide for a roll 183 as shown in FIGURE 7 in which the tubing element 181 is repeatedly wound upon itself. On the other hand, if such tubing 181 is wound in accordance with the method of the present invention, in which the tubing 13 is periodically rotated about its longitudinal axis simultaneously as it is collapsed, a package as shown at 185 would be provided. It will be noted that in the package 185 the tubing element 181 is in effect, distributed across the length of the roll thus avoiding distortion of the tubing and providing for a more attractive roll.

The amount of tubing rotation is a function of the tubing diameter and the distance the collapsing frames travel during their reciprocating movement. Best results are obtained when the die 9 is so positioned that the deformity in the tubing wall lies in the middle of the collapsed tubing, and the tubing is positively or forcibly rotated through an angle of 90° or multiples thereof by the collapsing frames. Preferably, the tubing is positively rotated through an angle of 90° or less since rotations of the more than 90° and less than 180° will cause the deformity to be laid upon itself more often at the ends of the rotations thus reducing the benefits of the disclosed apparatus.

It is to be understood that changes and variations may be made without departing from the spirit and scope of the invention as defined in the appended claims.

I claim:
1. Apparatus for forming and collecting a tubing including means for extruding flowable film-forming material in the form of a tubing having longitudinally extending elements which differ in thickness, means for solidifying the film-forming material of the tubing, means engaging with and collapsing the tubing as it travels longitudinally, means for retaining the collapsed portion of the tubing in a flattened condition and longitudinally advancing the same, means for winding the flattened tubing as a roll, and means for periodically moving said collapsing means relative to said retaining means to rotate and thereby twist the collapsed portion of the solidified tubing about its axis and relative to the flattened portion thereof whereby said twisted portion of tubing is permitted to at least partially untwist before being again rotated.

2. Apparatus for forming and collecting a tubing including means for extruding flowable film-forming material in the form of a tubing having longitudinally extending elements which differ in thickness, means for solidifying the film-forming material of the tubing, a pair of frames disposed in converging relationship for engaging with and collapsing the tubing as it travels therebetween, means for maintaining the collapsed portion of the tubing in a flattened condition and longitudinally advancing the same, means for winding the tubing as a roll and means for providing relative movement between said frames in a direction transverse to the direction of movement of said tubing whereby the tubing engaged between said converging frames is rotated about its longitudinal axis concomitantly with its collapsing and relative to the flattened portion of the tubing.

3. Apparatus for forming and collecting a tubing including means for extruding flowable film-forming material in the form of a tubing having longitudinally extending elements which differ in thickness, means for solidifying the film-forming material of the tubing, a pair of frames disposed in converging relationship for engaging with and collapsing the tubing as it travels therebetween, means for maintaining the collapsed portion of the tubing in a flattened condition while longitudinally advancing the same, means for winding the tubing as a roll and means for periodically providing relative movement between said frames in a direction transverse to the direction of movement of said tubing whereby the portion of the tubing which is engaged between said frames is rotated relative to the flattened portion thereof.

4. Apparatus as defined in claim 3 wherein said last mentioned means moves each of said frames in opposite directions and in alternate relationship to thereby oscillate the uncollapsed portion of the tubing about its longitudinal axis.

5. Apparatus for forming and collecting a tubing including means for extruding flowable film-forming material in the form of a tubing having longitudinally extending elements which differ in thickness, means for solidifying the film-forming material of the tubing, a pair of frames disposed in converging relationship for engaging with and collapsing the tubing as it travels therebetween, means for maintaining the collapsed portion of the tubing in a flattened condition and advancing the same longitudinally, means for winding the collapsed tubing as a roll and means for simultaneously moving the frames of said pair of frames in opposite directions and transversely of the direction of movement of said tubing whereby the tubing is rotated about its longitudinal axis concomitantly with the collapsing thereof and relative to the flattened portion of the tubing.

6. Apparatus for forming and collecting a thin-walled tubing including means for extruding flowable film-forming material in the form of a tubing having longitudinally extending elements which differ in thickness, means for maintaining the extruded tubing in an expanded condition, means for solidifying the film-forming material of the expanded tubing, a pair of frames disposed in converging relationship for engaging with and collapsing the expanded tubing as it travels therebetween, a pair of nip rolls between which the collapsed tubing travels, means for winding the collapsed tubing as a roll and means for simultaneously moving the frames of said pair of frames in opposite directions and transversely of the direction of movement of said tubing whereby the tubing is rotated about its longitudinal axis concomitantly with the collapsing thereof.

7. Apparatus as defined in claim 6 wherein said last mentioned means moves each of said frames in opposite directions and in alternate relationship to thereby oscillate the uncollapsed portion of the tubing about its longitudinal axis.

8. Apparatus as defined in claim 7 wherein said means for moving said frames relative to each other is operated at intermittent intervals.

9. Apparatus for forming and collecting a thin-walled tubing including means for extruding flowable film-forming material in the form of a tubing having longitudinally extending elements which differ in thickness, means for expanding the extruded tubing, means for solidifying the extruded tubing after it has been expanded, a pair of nip rolls for advancing the tubing from the extruding means, a pair of frames located between the extruding means and nip rolls, said rolls being disposed in converging relationship for engaging with and collapsing the expanded tubing as it travels therebetween, means for winding the collapsed tubing as a roll, means supporting said collapsing frames for sliding movement in directions transverse to movement of the tubing as it travels toward and between said collapsing frames, and means for simultaneously moving the collapsing frames alternately in opposite directions and at intermittent intervals to periodically rotate the tubing about its longitudinal axis concomitantly with the continuous advancement thereof.

10. Apparatus as defined in claim 9 wherein said means for simultaneously moving the collapsing frames includes a plurality of concentric sheaves, means for moving said sheaves along a path parallel to the axes of said nip rolls, and cables laced about and operated by said sheaves for moving said frames alternately in opposite directions.

References Cited by the Examiner

UNITED STATES PATENTS

| | | | |
|---|---|---|---|
| 2,291,238 | 7/1942 | Kimmick | 264—173 |
| 2,753,596 | 7/1956 | Bailey | 18—14 X |
| 2,844,846 | 7/1958 | Kronholm | 18—14 |
| 3,028,622 | 4/1962 | Park | 264—95 X |

FOREIGN PATENTS

| | | |
|---|---|---|
| 571,392 | 2/1959 | Canada. |
| 744,977 | 2/1956 | Great Britain. |

J. SPENCER OVERHOLSER, *Primary Examiner.*

WILLIAM J. STEPHENSON, *Examiner.*